United States Patent Office 3,400,127

Patented Sept. 3, 1968

3,400,127
TRIAZINE COMPOUNDS FOR MODIFYING POLYMERS

Giuliana C. Tesoro, Dobbs Ferry, N.Y., assignor to J. P. Stevens & Co., Inc., New York, N.Y., a corporation of Delaware No Drawing. Filed Aug. 22, 1963, Ser. No. 303,911
8 Claims. (Cl. 260—248)

The present invention relates to new and novel chemical compounds, methods of making said chemical compounds, and further to a method for chemically modifying polymeric materials containing active hydrogen to impart improved properties thereto, and the chemically modified polymeric materials produced thereby.

More particularly, this invention relates to a method for chemically modifying cellulosic textile materials with the aforesaid new and novel compounds so as to impart improved properties thereto.

Many methods are known for modifying polymeric materials containing active hydrogen, more particularly polymers containing hydroxyl groups, such as cellulosic materials, in order to improve various properties of these materials. Textile materials such as woven fabrics, can be treated so as to improve their various properties including crease recovery, flat drying properties, wrinkle resistance and the like, by the introduction of suitable ractive compounds which act as crosslinking agents. Among the crosslinking agents which have been previously employed are the resin type agents such as urea formaldehyde, melamine formaldehyde, cyclic ethylene urea formaldehyde, and the like, which are applied to the cellulosic textile materials from acidic solutions. However, one disadvantage inherent in the use of resins for crosslinking cellulosic materials is the deleterious effect by the acid on the various physical properties of the polymeric material.

Numerous other methods have been employed wherein the polymeric material is treated under alkaline conditions in order to improve the physico-chemical properties thereof. These have included, for example, treatment with unsaturated triazines and sodium bisulfite-modified triazines as disclosed in U.S. Patent 3,016,281. However, the unsaturated triazine compounds are not sufficiently water soluble, and although the sodium bisulfite compounds are described as being water soluble, the functionality of these compounds is severely reduced by saturating reactive groups in a non-reversible manner.

As will be more fully described hereinafter, the novel compounds of the present invention are unique in both structure and properties and succeed in overcoming the disadvantages associated with the known materials. Combining both water solubility and excellent functional reactivity, the compounds of the present invention possess the necessary characteristics to make them unusually valuable for imparting improved properties to textile materials.

Accordingly, it is an object of this invention to obviate the principal disadvantages inherent in the prior known compounds and provide new and novel compounds which are characterized by water solubility and excellent functional reactivity.

It is another object of this invention to provide new and novel chemical compounds which are suitable for the chemical modifications of polymeric materials containing active hydrogen to impart desired properties thereto.

It is a further object of this invention to provide a method for treating polymeric materials containing active hydrogen in order to impart improved physico-chemical properties thereto.

It is another object of this invention to impart desirable properties to cellulosic textile materials including crease recovery, wrinkle resistance, dimensional stability and the like.

It is another object of this invention to provide a method for treating cellulosic textile materials to simultaneously dye the textiles as well as impart improved properties of crease resistance, recovery and dimensional stability.

Still another object of this invention is to provide chemically modified textile fabrics having improved crease recovery, wrinkle resistance and dimensional stability.

In attaining the objects of this invention, one feature resides in forming a new group of triazine compounds which are water soluble and contain functional reactive groups, so as to make them excellent reagents for treating polymeric materials and change the physico-chemical properties of the materials.

Another feature of this invention resides in chemically modifying polymeric materials containing active hydrogen atoms by contacting the polymers with a novel group of reactive perhydro triazine derivatives, under alkaline conditions to obtain crosslinked materials having highly desirable properties.

Still another feature of the present invention resides in forming a dye complex with the novel perhydro triazine compounds of the present invention and contacting polymeric materials containing active hydrogen therewith under alkaline conditions to obtain crosslinked, dyed polymeric materials having highly desirable properties in a single operation.

Other objects, features and advantages of the present invention will become apparent from the following detailed description thereof.

The novel compounds of the present invention are represented by the following structural formula:

(1)

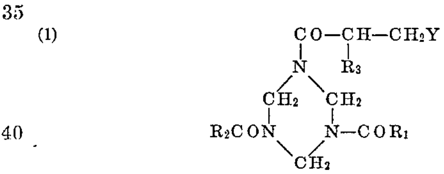

wherein $R_3$ is selected from the group consisting of hydrogen and methyl, Y is a polar residue derived from a reagent of weak nucleophilic character, $R_1$ and $R_2$ are selected from the group consisting of

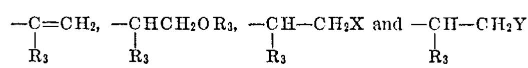

wherein X is halogen, e.g. Cl, Br, I.

The presence of the polar residue Y derived from a reagent of weak nucleophilic character imparts water solubility to the novel triazine compounds without limiting their reactivity. Nucleophilic character is defined as the tendency to donate electrons or share them with a foreign atomic nucleus. Reference is made to Gilman-Organic Chemistry, 2nd ed. vol. II, p. 1859.

The polar residue Y can generally be a member selected from the group consisting of the anion of a strong acid and the cation of a weak base and particularly the anion of a strong acid which has an ionization constant greater than $10^{-5}$ and the cation of a weak base, which base has an ionization constant lower than $10^{-5}$. Included among the anions of a strong acid are:

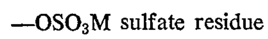

where M is selected from the group consisting of alkali metals, e.g. sodium, potassium, lithium, etc., and ammonium, —$SSO_3M$ thiosulfate residue where M has the same meaning as above, —OCOH formate residue
—$OCOCH_3$ acetate residue
—$OCOCH_2CH_3$ propionate residue and the like Included among the cations of a weak base are nitrogen containing heterocyclic residues, e.g.

—$\overset{+}{N}C_5H_5$ pyridinium
isoquinolinum and picolinium
benzyl dialkyl ammonium, e.g. benzyl dimethyl ammonium
—$\overset{+}{S}(R)_2$, dialkyl sulfonium residue where R is an alkyl group, and the like.

Included among the compounds coming within the scope of the above Formula I are compounds corresponding to the structural formula (II)

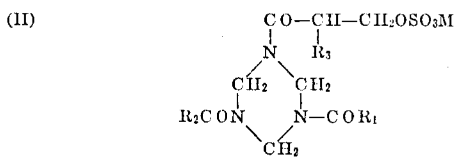

wherein $R_1$, $R_2$ and $R_3$ have the same meanings as above, and M is alkali metal or ammonium.

Further examples of compounds included within the Formula I above are those compounds corresponding to the generic formula (III)

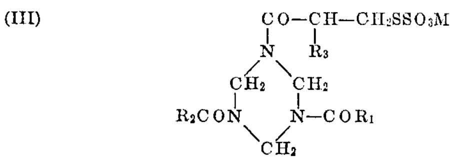

wherein $R_1$, $R_2$ and $R_3$ have the same meanings as above and M is alkali metal or ammonium.

Further compounds coming within the scope of Formula I above are compounds corresponding to the structural formula (IV)

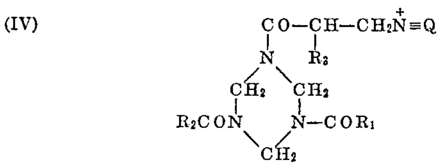

wherein $R_1$, $R_2$ and $R_3$ have the same meanings as given above and $\overset{+}{N}\equiv Q$ represents the residue of a lower alkyl tertiary amine and pyridine.

The novel triazine compounds of the present invention can be prepared by a number of methods. The exact method of preparation employed will depend upon the final structure of the material. In the case where $R_1$ and $R_2$ are both

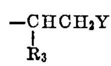

the compounds can be prepared by one of the following methods.

Beginning with a nitrile, the reaction can be carried out with a paraformaldehyde, trioxane or other formaldehyde polymer in the presence of an acid catalyst as shown in Equation 1.

(1)

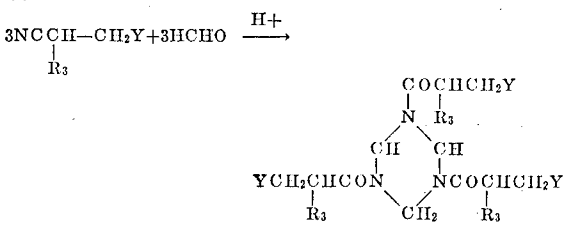

The same reaction product can also be obtained from the corresponding amide under conditions favoring removal of water.

Another method for the preparation resides in the reaction of a tris-beta halo propionyl triazine with a suitable reagent as shown in Equation 2 in the case where the reagent is pyridine and X represents a halogen:

(2)

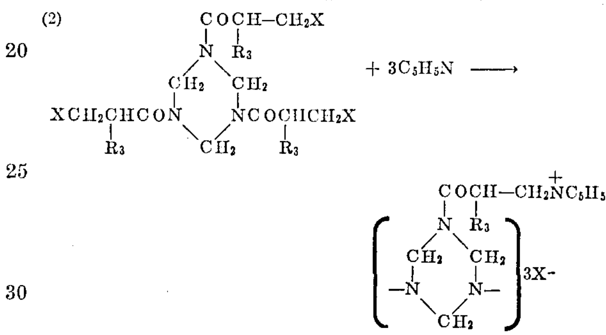

A further example of a suitable method of preparation is the reaction of tris-acryloyl or tris-methacryloyl triazine with a suitable reagent as shown by way of example employing sodium thiosulfate.

(3)

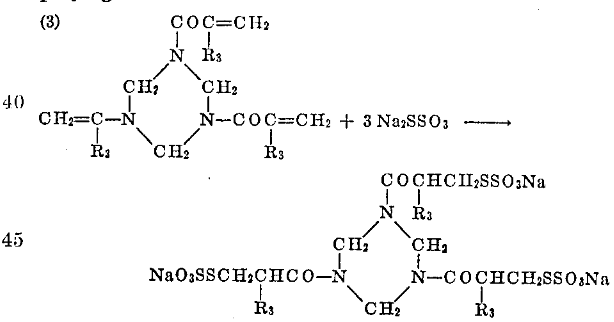

While the above methods of preparation are illustrative in the case of symmetrical compounds, i.e. wherein $R_1$ and $R_2$ are identical, the methods of preparation are adaptable to produce compounds wherein $R_1$ and $R_2$ are different. For example, mixtures of different nitriles as shown in Equation 1 can be employed. In the reaction shown in Equation 2, different mol ratios of reactants can be employed in the reaction and the residual halogen atom in the substituted triazine product can be converted or substituted in a subsequent step. It is preferable, however, to prepare compounds of Formula I wherein $R_1$ and $R_2$ are different by using an unsaturated triazine and carrying out addition reactions as required. For example, 1 mol of tris acryloyl s-perhydro triazine can be reacted with 1 mol or 2 mols of pyridine hydrochloride and the residual double bonds can, if desired, be saturated by reaction with an alcohol, with water or with other suitable reagents.

It has now been discovered that polymeric materials containing active hydrogen as determined by the Zerewitinov method can be treated according to the methods of the present invention in order to have their properties greatly enhanced while simultaneously retaining their tensile strength, tear strength and resistance to chlorine absorption by treating the aforesaid polymeric materials with the above group of novel reactive triazine compounds. More particularly, the process is particularly adapted for treating hydroxyl containing polymeric materials including cellulosic materials such as cotton, regenerated cellulose (rayon), linen and the like whether in fibrous, yarn or textile form or in textiles containing such cellulosic fibers in blends with other natural and/or synthetic fibers.

Under the proper reaction conditions the novel compounds will react as crosslinking agents for active hydrogen containing polymeric materials, when employed for treating textile materials according to the methods as hereinafter described, the triazine compounds of the present invention impart such desirable properties as dimensional stability and wrinkle resistance to the textiles.

In carrying out the method of the present invention, the polymeric material containing active hydrogen atoms is contacted with the novel triazine compounds of the present invention under conditions so as to achieve reaction between the triazine compound and the polymeric material. More particularly, cellulosic textile materials such as fabrics are treated according to the present invention by contacting the textile material with one or a mixture of triazine compounds in the presence of an alkaline catalyst. The triazine compound is usually in a solution, dispersion or emulsion in a suitable solvent. Water is the preferred solvent although suitable organic solvents and mixtures of water and organic solvents may also be employed.

The amount of triazine reagent contained in the treating composition can be varied over considerably wide limits depending on what material is treated and upon the extent of the chemical modification that is desired. Concentrations in the treating composition of about 3% to up to about 20% and more based on the weight of the fabric treated give excellent results although concentrations of about 5% to about 15% are preferred in many instances. Depending on the method of operation, the reactant and catalyst can be applied together or in separate applications with or without intermediate drying. After the fabric has been treated as above it is then heated to elevated temperatures for a brief period, either under anhydrous conditions or in the presence of moisture in order to induce the desired crosslinking reaction. When heated under anhydrous conditions, the heating operation is normally referred to as a curing operation whereas when the process is carried out in the presence of moisture it is referred to as a steaming operation. The temperature of the heating is usually at least about 200° F. for a time sufficient to produce a crosslinked product, i.e. about 10 minutes. Higher temperatures of heating e.g. temperatures higher than 300° F. require less time to achieve the desired results.

The catalysts which are suitable for the crosslinking of polymeric materials containing active hydrogen with the novel triazine compounds of the present invention are generally alkaline materials that produce an alkaline pH in the treating composition. Materials such as alkali metal hydroxides, carbonates, bicarbonates, silicates, phosphates and acetates are particularly effective. Non-volatile organic bases of equivalent strength as, for example, quaternary ammonium hydroxides are also suitable for present purposes. The concentration of the alkaline catalyst can be varied over considerably wide ranges although in general, it has been found that the amount should generally range in the neighborhood of about 5% to about 25% by weight of the treating composition. The amount of the alkaline catalyst should be sufficient to provide an excess over the amount equivalent to the concentration of the Y groups (see Formula I) in the treating composition and thus assure an alkaline pH which is required for the reaction to take place. A slight excess only is preferable since large amounts of free alkali tend to promote side reactions, which may be undesirable, during the crosslinking treatment. If desired, the treated fabric can be washed to remove residual alkali catalyst after the curing operation.

As pointed out above, inert solvents other than water can be used for the treating step without impairing the efficiency of the process. However, because organic solvents are generally costly, and complicate the procedure by requiring adequate provision for fume exhaust, it is generally preferred to use water as the medium for the treating composition. The solubility of the new compounds in water is sufficient to permit ease of application and accordingly represents an improvement in methods of treating textiles with triazines.

If desired, various other materials such as additives, softeners, water repellents and other finishing agents can be incorporated into the treating solution provided that the stability of the specific chemical system is not thereby impaired.

The compounds of the present invention are particularly effective crosslinking agents for polymers containing active hydrogen and particularly for cellulose. For example, cellulosic textiles can be treated with the new reactants in the presence of alkaline catalysts in order to improve their dimensional stability, resilience, and wash and wear properties. Although emphasis is placed on cellulose textile fabrics, it is to be understood that fibers and yarn can also be treated according to the methods of this invention.

The present invention further includes novel reactive dyestuffs and methods by which a textile material can be simultaneously dyed and crosslinked in a simple and efficient operation. Dyestuffs are employed for this purpose which are capable of reacting with one of the functional groups of the novel triazine compounds of the present invention. In spite of the blocking of one of its functional groups by a dye molecule, the triazine compounds of the present invention are capable of functioning as crosslinking agents. Moreover, the chemical bonds established between the dye, the reactant and the textile materials will assure that the textile possesses excellent color fastness properties.

Using the symbol Dye-H as representing a dyestuff molecule, this feature of the invention is schematically represented in the equation below in which the symbol Cell-OH represents the cellulose molecule.

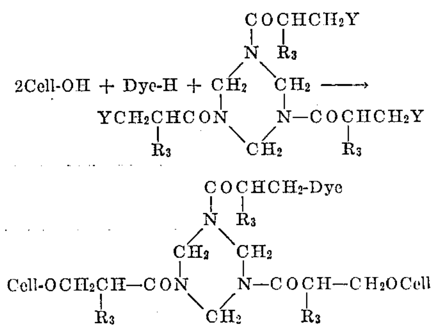

The symbols $R_3$ and Y have the same meaning as previously given.

The process illustrated by the equation above can take place under alkaline conditions and produces a dyed and crosslinked cellulose textile material in a single step combining the desirable properties obtained by crosslinking including dimensional stability and crease recovery with the desirable color fastness characteristics of reactive dyestuffs.

The reaction conditions employed in the methods of the present invention can be varied over a considerable range. For example, the reaction temperature can be varied from ambient temperature to about 400° F. with increasing reaction times required at lower temperature. At ambient temperature, several hours are necessary in order for the reaction to reach substantial completion while at temperatures above 200° F. a few minutes will suffice.

The following examples are illustrative of the present invention but are not considered as limiting in any way. In the examples which follow, the properties of the cellulosic fabrics treated with the novel compounds of the present invention were evaluated in accordance with the following test methods:

Crease recovery—Monsanto method: Technical manual of the American Association of Textile Chemists and Colorists, vol. 36, pp. 165–167 (1960).
Tensile strength—Ravel strip method: ASTM designation D–39–59.
Tear strength—Elmendorf method: ASTM designation D–1424–29.
Wash/wear evaluation—Test No. 88–1960: Technical manual of the American Association of Textile Chemists and Colorists, vol. 36, pp. 148–151 (1960).
Dimensional stability—Test No. 72–1956: Technical manual of the American Association of Textile Chemists and Colorists, vol. 36, pp. 95–96 (1960).
Chlorine damage—Test No. 92–1958: Technical manual of the American Association of Textile Chemists and Colorists, vol. 36, pp. 123–124 (1960).

Example I.—Preparation of 1,3,5-tris(beta-pyridinium-propionyl)-perhydro-s-triazine trichloride After stirring a mixture of 135.0 g. (0.375 M) of 1,3,5 - tris(beta-chloropropionyl)-3-perhydrotriazine and of 89.0 g. (1.12 M) of pyridine in 250 g. isopropanol for 40 hours at reflux temperature (83° C.), 100% conversion (determined from the ionic chloride content of the reaction mixture) was obtained. The crystalline product obtained was filtered and washed with acetone several times. The weight of the crystalline product was 150 g. corresponding to 70% yield. It was very soluble in water.

Equivalent weight (determined by electrometric titration with standard NaOH solution): 198.0 (calcd.: 198.5). Chloride ion content: 17.8% (calcd.: 17.8%).

Example II.—Preparation of 1-(beta-pyridinium-propionyl)-3,5-acryloyl-s-perhydro-triazine chloride 24.9 g. (0.1 M) of 1,3,5-tris-acryloyl-s-perhydrotriazine were dissolved in 3000 ml. of a 1 to 1 acetone-ethanol mixture at room temperature. To this solution 24.6 g. of a 46.8% pyridine hydrochloride solution in ethanol (corresponding to 0.1 M of pyridine hydrochloride) and 1.0 g. of triethylamine were added.

The reaction mixture was allowed to stand at room temperature for 10 days. Then the solvents were distilled off under reduced pressure until crystallization began. The crystals were filtered. 7.2 g. of crystalline product, corresponding to 19.6% yield, were obtained. The product was very soluble in water and methanol.

Equivalent weight (determined by electrometric titration with standard NaOH solution): 369.9 (calcd.: 364.5). Chlorine ion content: 9.04% (calcd.: 9.7%). Vinyl content (determined by reaction with dodecyl mercaptan): 13.85% (calcd.: 15.0%).

Example III.—Preparation of 1,3,5-tris-(beta-thiosulfato-propionyl)-s-perhydrotriazine (sodium salt)

119.5 g. (0.33 M) of 1,3,5-tris-(beta-chloropropionyl)-s-perhydro-triazine were dissolved in 400 g. of ethanol. This solution was added to a solution of 248.2 g. (1.0 M) of sodium thiosulfate penta-hydrate in 250 ml. of water. After stirring this reaction mixture for 9 hours at reflux temperature, 92.3% conversion was obtained (determined from the decrease of the $S_2O_3{=}$ content of the reaction mixture). The ethanol and the water were distilled off under reduced pressure. The residue was crystallized from isopropanol. The weight of the crystallized product was 217.5 g. The product was soluble in water. It contained 66.2% organic tris-triosulfate (determined from NaOH consumption at reflux temperature and also from the titration of the liberated $S_2O_3{=}$) 30.8% sodium chloride (determined by silver nitrate titration) and 3.0% water (determined by Karl-Fisher titration). The product was free of unsaturation and free of organic chlorine. The analysis of the crystalline product obtained in this manner showed that a 65.6% yield of the desired product was obtained in the reaction described.

Example IV.—Preparation of 1,3,5 tris-beta-sulfatopropionyl-s-perhydrotriazine (sodium salt)

151 grams (1 M) of anhydrous beta cyanoethyl sulfuric acid, obtained by sulfation of ethylene cyanohydrin with sulfamic acid and subsequent acidification of the ammonium salt formed, were reacted with 30 grams (1.0 M) of trioxane in dimethyl sulfoxide solvent. When no free formaldehyde remained, the product was diluted with an equal weight of water and cautiously neutralized with sodium carbonate to give an aqueous solution of the desired tris beta sulfatopropionyl compound.

Example V.—Textile treatment

Samples of 80 x 80 cotton print cloth were padded on a laboratory padder with an aqueous solution containing 20% of 1,3,5 tris-beta pyridinium propionyl-s-perhydrotriazine trichloride (product of Example I) at 100% wet pickup and dried. The samples were then padded with a 6% NaOH solution saturated with $Na_2SO_4$ to prevent leaching, dried and heated under various conditions to achieve reaction of the crosslinking agent with the cotton cellulose. After the heating step, the samples were washed and tested. The results obtained are summarized in Table I below.

TABLE I

| Reaction conditions | | Reaction yield, percent [1] | Crease recovery | | Tensile strength warp | Chlorine damage, percent |
|---|---|---|---|---|---|---|
| | | | Dry | Wet | | |
| A | Steamed (220° F.) 10 minutes | 64 | 221 | 242 | 50 | 3 |
| B | Steamed (220° F.) 30 minutes | 72 | 208 | 244 | 51 | 8 |
| C | Cured (325° F.) 5 minutes | 28 | 172 | 215 | 57 | Nil |
| Control | | | 141 | 152 | 59 | 6 |

[1] Calculated from the nitrogen content of the treated samples after washing.

This example demonstrates that excellent crease recovery, both wet and dry, are obtained with triazine compounds of this invention without a serious loss in tensile strength. In addition, it shows that the treated textiles are not damaged by chlorine.

Example VI.—Textile treatment

The experiment described in Example V was repeated, except that a 10% solution of potassium carbonate was used in place of the 6% NaOH solution. The results obtained are summarized in Table II below.

TABLE II

| Reaction conditions | | Reaction yield, percent | Crease recovery | | Dimensional stability (percent shrinkage) warp |
|---|---|---|---|---|---|
| | | | Dry | Wet | |
| A | Steamed (220° F.) 10 minutes | 93 | 228 | 276 | 0.0 |
| B | Steamed (220° F.) 30 minutes | 96 | 214 | 255 | 0.0 |
| C | Cured (325° F.) 5 minutes | 23 | 198 | 200 | 3.8 |
| Control | | | 141 | 132 | 8.6 |

This example, in addition to showing the excellent crease recovery properties obtained also demonstrates the high dimensional stability (resistance to shrinkage) produced by the methods of this invention.

Example VIII.—Textile treatment

Samples of 80 x 80 print cloth were padded with 15% aqueous solution of 1,3,5 tris-beta-triosulfatopropionyl-s-perhydrotriazine (sodium salt, product of Example III) at 100% wet pickup. After drying, they were padded with a 6% NaOH solution and reacted under various conditions. The results obtained in this experiment are summarized in Table III below.

TABLE III

| Reaction conditions | | Reaction yield, percent | Crease recovery | | Tensile strength warp (lbs.) | Tear strength warp (lbs.) |
|---|---|---|---|---|---|---|
| | | | Dry | Wet | | |
| A | 24 hours at room temp. (wet) | 71 | 195 | 215 | 47 | 1.4 |
| B | Cured (325° F.) 5 minutes | 33 | 195 | 208 | 42 | 1.2 |
| C | Steamed (220° F.) 10 minutes | 57 | 183 | 200 | 56 | 1.6 |

Example VIII.—Textile treatment

A sample of rayon challis fabric was treated by padding with a 15% aqueous solution of 1-beta pyridinium propionyl, 3,5 acryloyl-s-perhydrotriazine (product of Example II) containing 4% potassium carbonate. The sample was dried, then steamed for 10 minutes at 220° F. and washed. The treated fabric exhibited greatly improved wash/wear and crease recovery properties. Furthermore, it did not shrink significantly after 5 machine launderings at 140° F. while a sample of untreated fabric shrank 13% in the warp direction under the same conditions of laundering.

By using the new and novel triazine compounds of the present invention, the properties of polymeric materials containing active hydrogen, more particularly, cellulosic textile can be greatly improved in a simple and economical manner. The new compounds are trifunctional, water soluble, highly reactive and efficient. They can be applied from aqueous solution in conventional textile equipment thereby obviating any need for special equipment to rid the atmosphere of organic solvent fumes. Moreover, excellent crease recovery, both in the wet and dry state, excellent wash and wear performance in spin drying, drip drying and tumble drying as well as excellent dimensional stability in the treated textile materials can be achieved without causing significant changes in moisture regain or tendency to retain chlorine. These properties are durable to a large number of launderings and are obtained without impairing strength and abrasion resistance of the treated fabric beyond the expected losses due to the crosslinking reaction.

What is claimed is:

1. A compound corresponding to the formula

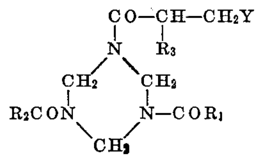

wherein:

$R_3$ is selected from the group consisting of hydrogen and methyl,

Y is an anion of a strong acid having an ionization constant greater than $10^{-5}$, selected from the group consisting of —$OSO_3M$, —$SSO_3M$, —OCOH, $OCOCH_3$, and —$OCOC_2H_5$, where M is a member selected from the group consisting of alkali metal and ammonium, $R_1$ and $R_2$ are selected from the group consisting of $$-\underset{R_3}{\underset{|}{C}}=CH_2,\quad -\underset{R_3}{\underset{|}{C}}HCH_2OR_3,\quad -\underset{R_3}{\underset{|}{C}}H-CH_2X \text{ and } -\underset{R_3}{\underset{|}{C}}H-CH_2Y$$

wherein: X is halogen.

2. A compound corresponding to the formula

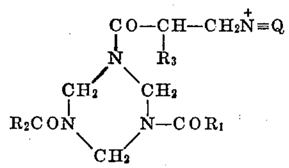

wherein:

$R_3$ is selected from the group consisting of hydrogen and methyl, $R_1$ and $R_2$ are selected from the group consisting of $$-\underset{R_3}{\underset{|}{C}}=CH_2,\quad -\underset{R_3}{\underset{|}{C}}HCH_2OR_3, \text{ and } -\underset{R_3}{\underset{|}{C}}H-CH_2X$$

wherein:

X is halogen, and $\overset{+}{N}\equiv Q$ represents the residue of a cation selected from the group consisting of cations from lower alkyl tertiary amines and from pyridine.

3. A compound having the formula

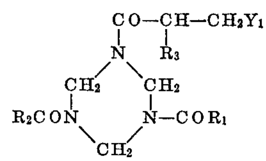

wherein:

$R_3$ is selected from the group consisting of hydrogen and methyl, $Y_1$ is selected from the group consisting of —$OSO_3M$, —$SSO_3M$, —OCOH, —$OCOCH_3$, —$OCO_2H_5$, —$NC_5H_5$,

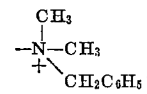

isoquinolinium, picolinium, and —$\overset{+}{S}(R)_2$, where R is an alkyl group and M is a member of the group consisting of alkali metal and ammonium, $R_1$ and $R_2$ are selected from the group consisting of

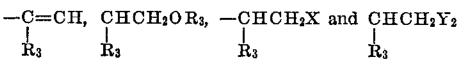

where:

X is halogen, and $Y_2$ is selected from the group consisting of —$OSO_3M$, —$SSO_3M$, —$OCOCH_3$, —$OCOC_2H_5$ and —$\overset{+}{S}(R)_2$.

4. A compound having the formula

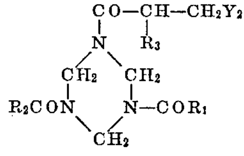

wherein:

$R_3$ is selected from the group consisting of hydrogen and methyl, $Y_2$ is selected from the group consisting of —$OSO_3M$, —$SSO_3M$, —OCOH, —$OCOCH_3$, —$OCOC_2H_5$ and —$\overset{+}{S}(R)_2$, where R is an alkyl group and M is a member of a group consisting of alkali metal and ammonium, $R_1$ and $R_2$ are selected from the group consisting of

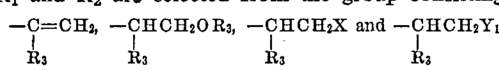

where:

X is halogen, and $Y_1$ is selected from the group consisting of $-OSO_3M$, $-SSO_3M$, $-OCOH$, $-OCOCH_3$, $-OCO_2H_5$, $-NC_5H_5$,

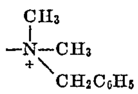

isoquinolinium, picolinium, and $-\overset{+}{S}(R)_2$.

5. A compound having the formula

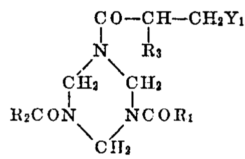

wherein:

$R_3$ is selected from the group consisting of hydrogen and methyl, $Y_1$ is selected from the group consisting of $-OSO_3M$, $-SSO_3M$, $-OCOH$, $-OCOCH_3$, $-OCO_2H_5$, $-NC_5H_5$,

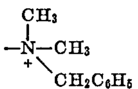

isoquinolinium, picolinium, and $-\overset{+}{S}(R)_2$, where R is an alkyl group and M is a member of the group consisting of alkali metal and ammonium, $R_1$ and $R_2$ are selected from the group consisting of

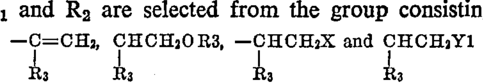

where:

X is halogen, and $R_1$ and $R_2$ are different.

6. 1 - beta - pyridiniumpropionyl - 3,5 - acryloyl-s-perhydro triazine chloride.

7. 1,3,5 tris - beta - thiosulfatopropionyl - s - perhydro triazine.

8. 1,3,5 tris-beta-sulfatopropionyl-s-perhydro triazine, sodium salt.

References Cited

UNITED STATES PATENTS

| | | | |
|---|---|---|---|
| 2,568,620 | 9/1951 | Gresham et al. | 260—248 |
| 2,615,887 | 10/1952 | Zerner et al. | 260—248 |
| 2,651,631 | 9/1953 | Zerner et al. | 260—248 |
| 2,910,467 | 10/1959 | Wimmer | 260—248 |
| 2,940,817 | 6/1960 | Browne | 8—116.2 |
| 2,978,289 | 4/1961 | Barker et al. | 8—54.2 |
| 3,016,281 | 1/1962 | Kropa et al. | 260—248 X |
| 3,028,385 | 4/1962 | Batzer et al. | 260—248 |
| 3,043,649 | 7/1962 | Hegmann | 8—54.2 |
| 3,347,617 | 10/1967 | Ulrich et al. | 8—42 |

FOREIGN PATENTS

| | | |
|---|---|---|
| 609,825 | 4/1962 | Belgium. |

HENRY K. JILES, *Primary Examiner.*

J. M. FORD, *Assistant Examiner.*